United States Patent
Hershkowitz et al.

(10) Patent No.: US 7,503,948 B2
(45) Date of Patent: *Mar. 17, 2009

(54) SOLID OXIDE FUEL CELL SYSTEMS HAVING TEMPERATURE SWING REFORMING

(75) Inventors: Frank Hershkowitz, Liberty Corner, NJ (US); Paul J. Berlowitz, Glen Gardner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 858 days.

This patent is subject to a terminal disclaimer.

(21) Appl. No.: 10/848,095

(22) Filed: May 18, 2004

(65) Prior Publication Data

US 2004/0241505 A1 Dec. 2, 2004

Related U.S. Application Data

(60) Provisional application No. 60/472,864, filed on May 23, 2003.

(51) Int. Cl.
*C01B 3/32* (2006.01)
*C01B 3/36* (2006.01)
*C10J 3/46* (2006.01)
*C10J 3/54* (2006.01)
*F28D 21/00* (2006.01)

(52) U.S. Cl. .................... 48/198.7; 48/197 R; 422/206
(58) Field of Classification Search .............. 48/197 R, 48/198.7; 422/206
See application file for complete search history.

(56) References Cited

U.S. PATENT DOCUMENTS

| | | | | |
|---|---|---|---|---|
| 2,556,835 | A | * | 6/1951 | Barr ........................... 48/198.1 |
| 2,845,335 | A | * | 7/1958 | Hasche ........................ 422/206 |
| 4,240,805 | A | | 12/1980 | Sederquist ................. 48/214 R |
| 6,083,636 | A | * | 7/2000 | Hsu ............................... 429/13 |
| 6,113,874 | A | | 9/2000 | Kobayashi .................. 423/650 |
| 6,210,157 | B1 | | 4/2001 | Kobayashi ................... 423/181 |
| 6,767,530 | B2 | | 7/2004 | Kobayashi et al. .......... 423/650 |
| 2002/0054837 | A1 | * | 5/2002 | Abe et al. .................... 422/174 |
| 2003/0113257 | A1 | | 6/2003 | Kobayashi et al. .......... 423/652 |

FOREIGN PATENT DOCUMENTS

| | | |
|---|---|---|
| WO | WO 0039875 | 7/2000 |
| WO | WO 0113452 A1 | 2/2001 |
| WO | WO 2004000725 A1 | 12/2003 |

* cited by examiner

*Primary Examiner*—Alexa D Neckel
*Assistant Examiner*—Matthew J Merkling
(74) *Attorney, Agent, or Firm*—Paul E. Purwin

(57) ABSTRACT

The present invention provides an improvement in the process of producing energy from fuel cells. A cyclic reforming process, referred to as temperature swing reforming, provides an efficient means for producing a hydrogen containing synthesis gas for use in solid oxide fuel cell applications. In one embodiment, at least some synthesis gas which is first produced in the temperature swing reforming process is combusted with air to provide the heat for the regeneration step of the temperature swing reforming process. The syngas produced in TSR is particularly well suited for use in solid oxide fuel cell applications.

23 Claims, 2 Drawing Sheets

SOLID OXIDE FUEL CELL SYSTEMS HAVING TEMPERATURE SWING REFORMING

This application claims the benefit of U.S. Provisional Application No. 60/472,864 filed May 23, 2003.

FIELD OF THE INVENTION

The present invention relates to process improvements in the production of hydrogen from hydrocarbon fuel and its use in fuel cells. More particularly, the invention relates to a process scheme wherein synthesis gas produced in a cyclic reforming process is integrated with and used in a solid oxide fuel cell ("SOFC"). The cyclic reforming process is herein referred to as "Temperature Swing Reforming" or "TSR" for short. In temperature swing reforming, the reforming step of the synthesis gas production is followed by a regeneration step. The hydrogen stream produced by TSR is particularly well suited for use in a SOFC being at temperatures conducive to efficient use by that type of fuel cell. In a preferred embodiment, TSR is integrated physically with the SOFC to increase the overall efficiency of the system. The present invention provides an efficient process for producing energy from a hydrocarbon fueled fuel cell system, particularly useful for confined space applications such as "on board" vehicle applications (e.g. passenger vehicles, trucks, buses or the like) and distributed power systems.

BACKGROUND OF THE INVENTION

Solid oxide fuel cells hold promise for a variety of power applications including distributed power generation and vehicular use. Present SOFC systems are capable of operating at substantially higher temperatures than polymer electrolyte or direct alcohol fuel cell systems, being able to withstand temperatures of as high as 1000° C. Moreover, SOFC are substantially more tolerant of "contaminant" gases that often accompany the hydrogen fuel, particularly when produced from a hydrocarbon source. The present invention integrates temperature swing reforming with a solid oxide fuel cell to provide an efficient power generation process that can be fueled with common hydrocarbon fuel.

Conventional synthesis gas generating processes include steam reforming, gas phase partial oxidation and autothermal reforming. Each of these processes has advantages and disadvantages when compared to each other.

In a steam reforming process, steam is reacted with a hydrocarbon containing feed to produce a hydrogen-rich synthesis gas. The general stoichiometry, as illustrated for methane, is:

$$CH_4 + H_2O \rightarrow CO + 3H_2 \tag{1}$$

Typically, an excess of steam is used to drive the equilibrium to the right. As applied to hydrogen manufacture, excess steam also serves to increase the water gas shift reaction:

$$CO + H_2O \rightarrow CO_2 + H_2 \tag{2}$$

Because of the high endothermicity of the reaction, steam reforming is typically carried out in large furnaces, in which a reforming catalyst is packed into tubes. The tubes must withstand the high pressure of the produced synthesis gas, while transmitting heat at temperatures approaching 1000° C. As described in Stanford Research Institute International Report No. 212 (1994), steam reforming process efficiency, (defined as the heat of combustion of product hydrogen divided by the heat of combustion of reforming feed and furnace fuel), is approximately 74%, while the space velocity, (defined as Standard Cubic Feet per Hour of $C_1$-equivalent feed/ft³ of catalyst bed) is 1000 hr⁻¹. Unfortunately, steam reforming furnaces occupy a very large volume of space, substantially greater than the tube volume. This feature, and the relatively low efficiency, combine to severely limit its utility in point-of-use fuel applications such as fuel cells and would likely be unfeasible for on-board vehicle applications or distributed power applications.

Sederquist (U.S. Pat. Nos. 4,200,682, 4,240,805, 4,293, 315, 4,642,272 and 4,816,353) teaches a steam reforming process in which the heat of reforming is provided within the bed by cycling between combustion and reforming stages of a cycle. As noted by Sederquist, high quality heat recovery within reforming bed can produce results in a theoretical efficiency of about 97%. However, these patents describe a process that operates at very low productivity, with space velocities of around 100 hr⁻¹ (as $C_1$-equivalent). One consequence of Sederquist's low space velocity is that resulting high heat losses impede their ability to achieve high efficiency. The present invention solves this problem.

The inventors here have discovered a process for producing hydrogen from a hydrocarbon containing fuel integrated with a solid oxide fuel cell that produces a highly efficient power generating system.

SUMMARY OF INVENTION

The present invention provides an improvement in the process of producing electricity from fuel cells where the fuel cell is fueled with a hydrocarbon containing synthesis gas. A cyclic reforming process, referred to as temperature swing reforming, provides an efficient means for producing a hydrogen containing synthesis gas for fuel cell applications. Temperature swing reforming is integrated with a solid oxide fuel cell to achieve thermal and material efficiencies relative to conventional fuel processor/fuel cell systems. In one embodiment the temperature swing reforming process is physically integrated with the SOFC. The integrated design results in high system efficiency. Specific embodiments are detailed hereinafter.

The process of temperature swing reforming, detailed hereinafter, is generally described as:
(a) introducing a feed stream comprising a hydrocarbon and steam at a space velocity greater than about 500 hr⁻¹ through a first end of a first zone containing bed packing materials and a steam reforming catalyst that are heated to a reforming temperature to produce a synthesis gas stream containing $H_2$, $CO$ and $CO_2$.
(b) passing at least a portion of the product of step (a) to a second zone containing bed packing materials via the first end of 2nd zone, and transferring the heat from the synthesis gas stream to the packing materials;
(c) removing substantially all of the product from said second zone via the second end of 2nd zone;
(d) introducing an oxygen-containing gas into the second end of said second zone;
(e) contacting said oxygen-containing gas with a fuel and combusting said gas and fuel within said zones, thereby re-heating said first zone to reforming temperatures and creating a fluegas which exits through the first end of said first zone.

The feed stream space velocity (i.e. greater than about 500 hr⁻¹) is based upon the entire bed area. The temperature swing reforming process efficiently produces a hydrogen containing synthesis gas that is used to fuel a high temperature fuel cell, typically a solid oxide fuel cell.

Solid-oxide fuel cells (SOFCs) are conventionally made from solid-state materials, with electrolytes generally comprising an ion conducting ceramic oxide. As in other fuel cells, SOFCs consist of three components: a cathode, an anode, and an electrolyte sandwiched between the two. The anode in an SOFC is a solid which may conduct either oxygen or hydrogen ions, but most commonly conducts oxygen ions. Oxygen from air is dissociated and then reduced at the cathode to $O^=$. These ions travel through the electrolyte to the anode, where they react with fuel that has been delivered to the anode. The fuel (e.g. hydrogen) is oxidized by the oxygen ions and releases electrons to an external circuit, thereby producing electricity. The electrons then return to the cathode, thus continuing the electricity-generating cycle. Individual cells can be stacked together in series to generate higher voltages as each cell typically produces from 0.5 to 1.2V. The simple reaction for a hydrogen fueled oxide ion conducting fuel cell may be expressed as follows:

| Cathode | $1/2\ O_2 + 2\ e^- \rightarrow O^=$ |
| Anode | $H_2 + O^= \rightarrow H_2O + 2e^-$ |
| Overall | $1/2\ O_2 + H_2 \rightarrow H_2O$ |

The oxide ion is relatively large, of the order of 1.4 angstroms, requiring sufficient thermal energy for efficient diffusion in the solid electrolyte. Oxide ion SOFCs typically operate at temperatures above 600° C., most typically between 700° C. and 1000° C. The present invention is directed to a TSR integrated with a oxide ion conducting SOFC.

The illustrative embodiments of the invention are set forth in the detailed description hereinafter.

DETAILED DESCRIPTION

Figure 1:
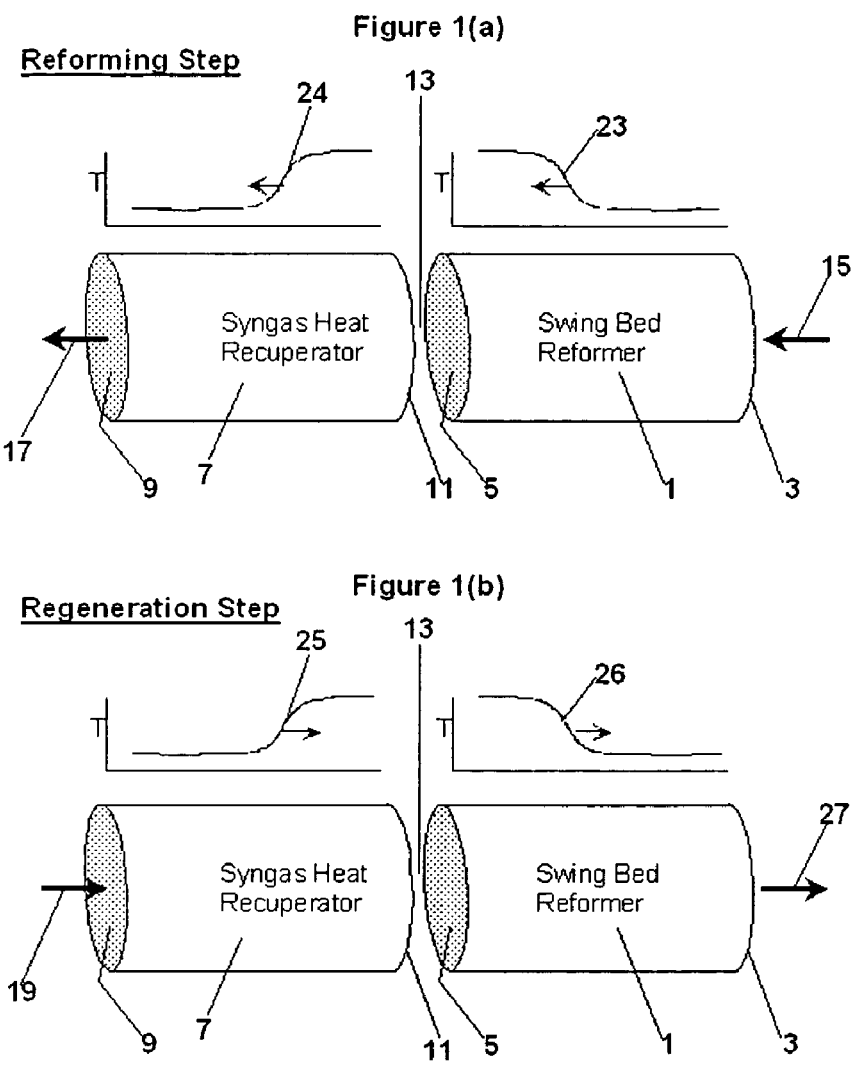
FIGS. 1a and 1b are diagrammatic illustrations of the reforming and regeneration steps of temperature swing reforming.

The basic two-step cycle of temperature swing reforming is depicted in FIG. 1. Referring now to FIGS. 1a and 1b, there is illustrated a first zone, or reforming zone (1), also called a swing bed reformer, and a second zone, or recuperating zone, also called a synthesis gas heat recuperator (7). The beds of both zones will include packing material, while the reforming zone (1) bed will include catalyst for steam reforming. Though illustrated as separate reforming and recuperating zones, it is to be recognized that the temperature swing reforming apparatus may comprise a single reactor, and further, that the apparatus may be physically integrated with the solid oxide fuel cell apparatus.

As shown in FIG. 1a, at the beginning of the first step of the cycle, also called the reforming step, the reforming zone (1) is at an elevated temperature ranging from about 100° to about 1600° C. and the recuperating zone (7) is at a lower temperature than the reforming zone (1). A hydrocarbon-containing feed is introduced via a conduit (15), into a first end (3) of the reforming zone (1) along with steam. The hydrocarbon may be any material that undergoes an endothermic steam reforming reaction including methane, petroleum gases, petroleum distillates, kerosene, jet fuel, fuel oil, heating oil, diesel fuel, gas oil and gasoline. The feed material may also comprise alcohols such as methanol, ethanol and the like. Preferably the hydrocarbon will be a gaseous material or one which will rapidly vaporize upon introduction into the reforming zone (1). Preferably, the steam will be present in proportion to the hydrocarbon in an amount that results in a steam to carbon ratio between about 1 and about 3 (considering only carbon in the hydrocarbon, not carbon in CO or $CO_2$ species that may be present).

This feed stream is heated (i.e. picks up heat from) the bed and is converted over the catalyst to synthesis gas. As this step proceeds, a temperature profile (23) is created based on the heat transfer properties of the system. This temperature profile typically comprises a gradient from the lower temperature of the reformer inlet that ranges from 100-700° C., to the reforming bed temperature that ranges from about 800° C. to about 1600° C. When the bed is designed with adequate heat transfer capability, as described herein, this profile has a relatively sharp temperature gradient, which gradient will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (i.e. at temperatures ranging from about 200° C. to about 1,000° C. and preferably from about 400° C. to about 600° C.). As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming step. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the hydrocarbon feed that has been entering via conduit (15) (i.e. at temperatures ranging from about 100° C. to about 700° C. preferably from about 200° to about 600° C. and most preferably from about 300° C. to about 500° C.).

In the practice of temperature swing reforming, there are alternative means for determining the end of the reforming step. Toward the end of the reforming step, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, CO and $CO_2$. The term percent conversion, as used herein, is calculated as the percent conversion of the carbon in feed hydrocarbonaceous species into synthesis gas species of CO and $CO_2$. The term unconverted product hydrocarbons, as used herein, refers to product hydrocarbonaceous species that are not synthesis gas components of $H_2$, CO and $CO_2$. These typically include product methane, as well as feed hydrocarbons and the cracking products of feed hydrocarbons. The reforming step ends when the reforming performance deteriorates to a level that is below acceptable limits. In practice, optimization of the overall reforming and synthesis gas utilization process will dictate a desired, time-averaged level of reforming conversion. That time-averaged level of reforming conversion is typically greater than 80%, preferably greater than 90%, and most preferably greater than 95%.

The point in time at which the reforming step is ended, and thus the duration of the reforming step, may be chosen (a) as a response to the time-varying performance of the reformer during each reforming step; or (b) based on overall (time-averaged) performance or the system; or (c) fixed as a constant reforming step duration, or a combination thereof. In embodiment (a), at least one feature of the operation is monitored that is correlated to the reforming performance. This feature may be a composition such as $CH_4$, $H_2$, or CO, or alternatively a temperature, such as the temperature at the end (5) of the reforming bed. In one embodiment of the present invention, the reforming step is ended when the temperature at the end (5) of the reforming has decreased to a pre-selected temperature between about 700° C. and about 1200° C. In embodiment (b), the reforming step duration is adjusted based on a measured feature that reflects the overall (time-averaged) performance or the system. This may be an average product composition such as $CH_4$, $H_2$, or CO. In an alternate embodiment of the present invention, the reforming step duration is adjusted based on the time-averaged concentration of $CH_4$ in the product, using control strategies known in the art to shorten or lengthen the step duration to achieve a predetermined target $CH_4$ amount. In a preferred alternative of this embodiment, the target $CH_4$ amount is set at an amount that represents between about 1% and about 15% of the hydrocarbonaceous feed carbon. In case (c), the reforming step duration is of fixed length, at a value that is predetermined to be acceptable for the space velocity of the operation. In one embodiment the present invention, the reforming step duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration step begins. The regeneration step, illustrated in FIG. 1b, transfers heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). The combustion preferably occurs at a region proximate to the interface (13) of the recuperation zone (7) and the reforming zone (1). The term, "region proximate", in the present invention, means the region of the TSR beds in which regeneration step combustion will achieve the following two objectives: (a) the heating of the reforming zone such that end (5) of the reforming zone is at a temperature of at least 800° C., and preferably at least 1000° C. at the end of the regeneration step; and (b) the cooling of the recuperation zone to a sufficient degree that it can perform its function of accepting synthesis gas sensible heat in the subsequent reforming step. Depending on specific regeneration embodiments described herein, the region proximate to the interface can include from 0% to about 50% of the volume of the recuperation zone (7), and can include from 0% to about 50% of the volume of the reforming zone (1). In a preferred embodiment of the present invention, greater than 90% of the regeneration step combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this embodiment, the location of combustion is controlled by a combination of temperature, time, fluid dynamics and catalysis. Fuel and oxygen conventionally require a temperature-dependent autoignition time to combust. In one embodiment, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another embodiment, the location of combustion is fixed by mechanical design of the recuperating zone. In this design, the fuel and oxygen-containing gas are travelling in separate channels (not shown), which prevent combustion until the feeds combine at the interface of the zones (13). At that location, flame holders (not shown) or a catalyst in the reforming zone may be used to initiate combustion.

The combustion of the fuel and oxygen-containing gas creates a hot fluegas that heats the reforming zone (1) as the flue gas travels across that zone. The fluegas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, non-combustible gases such as $H_2O$, $CO_2$, and $N_2$ can be added to the mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration step, this outlet temperature will be substantially equal to the inlet temperature of the reforming feed of the preceding, reforming, step. As the regeneration step proceeds, this outlet temperature will increase slowly and then rapidly as the temperature gradient reaches end (3), and can be 50-500° C. above the temperature of the reforming feed by the end of the step.

The reforming zone is now, once again, at reforming temperatures suitable for catalytic reforming.

In the practice of pressure swing reforming, there are alternative means for determining the end of the regeneration step. The regeneration step ends when sufficient heat has been supplied or conveyed to the reforming bed to enable the carrying out of the reforming step. The point in time at which the regeneration step is ended, and thus the duration of the regeneration step, may be chosen (a) as a response to the time-varying performance of the PSR during each regeneration step; or (b) based on overall (time-averaged) performance or the system; or (c) fixed as a constant regeneration step duration. In embodiment (a), some feature of the operation is monitored that is related to the regeneration performance. This feature could be a composition such as $O_2$, $CH_4$, $H_2$, or CO, or could be a temperature such as the temperature at the end (3) of the reforming bed. In one embodiment of the present invention, the regeneration step is ended when the temperature at the end (3) of the reforming bed has increased to a pre-selected temperature between about 200° C. and about 800° C. In embodiment (b), the regeneration step duration is adjusted based on a measured feature that reflects the overall (time-averaged) performance of the system. This feature may be an average product composition such as $CH_4$, $H_2$, or CO, or some other system measurement. In one embodiment of the present invention, the regeneration step duration is adjusted based on the time-averaged concentration of $CH_4$ in the product, using control strategies known in the art to shorten or lengthen the duration to achieve the target $CH_4$ amount. In a preferred embodiment, the target $CH_4$ amount is set at an amount that represents between about 1% and about 15% of the hydrocarbonaceous feed carbon. In embodiment (c), the regeneration step duration is of fixed length, at a value that is predetermined to be acceptable for the space velocity of the operation. In one embodiment the present invention, the regeneration step duration is fixed at a duration between about 0.1 second and about 60 seconds and preferably 1.0-30 seconds. In all of these cases, but particularly in embodiment (c), it is preferable to also adjust the regeneration flow rates to increase or decrease the amount of heat added to the bed during the step—in a manner similar to that described with respect to adjustment of duration in embodiment (b), above. In a further embodiment of the present invention, the regeneration step duration is fixed at a duration between about 1 second and about 60 seconds, and the regeneration flow rate is adjusted over time so that the time-average concentration of CH4 in the reforming product approaches a target $CH_4$ amount that is set at an amount that represents between about 1% and about 15% of the hydrocarbonaceous feed carbon.

The space velocity of a system is typically expressed on an hourly basis as the standard volumetric gas flow rate of feed divided by the total volume of catalyst bed(s), referred to as gaseous hourly space velocity, or "GHSV." Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1$GHSV, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hr into a 1.0L bed would be said to have a space velocity of 7,000. This definition is based on feed flow during the reforming step and wherein the bed volume includes all catalysts and heat transfer solids in the reforming and recuperating zones.

In temperature swing reforming, the space velocity, $C_1$GSHSV, typically ranges from about 500 to about 150,000, preferably from about 1,000 to about 100,000, and most preferably from about 2,000 to about 50,000.

In a preferred embodiment temperature swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 $hr^{-1}$/3600 s/hr, where 2.2 cal/cc is the heat of reforming of methane per standard volume of methane, and 8000 is the $C_1$GHSV of methane. When the duration of reform and regeneration steps are comparable, the value of H will be comparable in the two steps. The volumetric heat transfer coefficient of the bed, $h_v$, the determination of which is known in the art, and is typically calculated as the product of a area-based coefficient (e.g. cal/cm$^2$s° C.) and a specific surface area for heat transfer ($a_v$, e.g. cm$^2$/cm$^3$), often referred to as the wetted area of the packing.

TSR is typically conducted at pressures ranging from about zero to about twenty atmospheres. The cyclic operation of TSR results in temporal difference, preferably temporal isolation, between the reforming cycle and the regeneration cycle. This permits operation of the reforming step at pressure different from the regeneration step. In a preferred embodiment, the reforming step is preferred at pressures ranging from about zero to about five atmospheres and the regeneration step is performed at pressure ranging from about zero to about four atmospheres. It is also preferred to perform the reforming step at a higher pressure than the regeneration step with the pressure differential between the two steps preferably less than five atmospheres and more preferably less than one atmosphere. Use of higher pressure may be advantageous, for example, when the fuel cell TSR system is coupled with turbine or other such power generation means.

The bed packing material is selected so that its heat transfer characteristics enable, high space velocity. It is known in the art that bed packing can be characterized for heat transfer coefficient (h) and characterized for heat transfer surface area (often referred to as wetted area, $a_V$). Correlations for these parameters, based on gas and solid properties, are well known. The product of these two parameters is the bed's heat transfer coefficient on a bed volume basis:

Volumetric heat transfer coefficient:

$$h_v = \frac{\text{BTU}}{(\text{ft}^3 \text{ Bed})(° \text{ F.})(s)} \text{ or} = \frac{\text{kcal}}{(L \text{ Bed})(° \text{ C.})(s)}$$

The heat transfer coefficients are sensitive to a variety of gas properties, including flow rate and composition. Coefficients are typically higher during reforming because the hydrogen in the gas has very high thermal conductivity. Coefficients are typically increased by decreasing the characteristic size of the packing (e.g., hence ⅛" beads will have higher $h_V$ than ½" beads).

Determining the heat of reforming of hydrocarbons is well known, and can be expressed on a basis of units of heat per standard volume of hydrocarbon gas. The heat transfer requirement for this TSR system can be expressed as the product of volumetric heat of reforming with the GHSV of the feed.

Volumetric heat transfer requirements of the system are expressed as:

$$H = \frac{GHSV \cdot \Delta H_{REF}}{3600 \text{ s/hr}} = \frac{BTU}{(ft^3 \text{ Bed})(s)} \text{ or } = \frac{kcal}{(L \text{ Bed})(s)}$$

In this equation, GHSV and $\Delta H_{REF}$ have substantially identical units of feed amount. Thus, if the units of GHSV are as NL/hr of $C_1$ per L bed, then the units of $\Delta H_{REF}$ are heat of reaction per NL of $C_1$.

A heat transfer delta-temperature $\Delta T_{HT}$, is also used herein to characterize the TSR system, as taught herein. $\Delta T_{HT}$ is defined herein as the ratio of volumetric heat transfer requirement to volumetric heat transfer coefficient.

Characteristic heat transfer $\Delta T_{HT} = H/h_v$.

This characteristic $\Delta T_{HT}$ describes the balance between heat transfer supply and demand. As used herein, the $\Delta T_{HT}$ is calculated using heat transfer coefficients based on typical regeneration conditions. The characteristic $\Delta T_{HT}$ is a design parameter for the present invention. Packing or space velocity are chosen to satisfy characteristic $\Delta T_{HT}$ requirements of this invention.

$\Delta T_{HT}$ for the present invention is between about 0.1° C. and about 500° C. More preferably, the characteristic $\Delta T$ is between about 0.5° C. and 40° C. For example, if a packing has a heat transfer coefficient of 10 BTU/ft³s° F., then given a methane heat of reforming of 248 BTU/scf the $C_1$GHSV achievable at a characteristic $\Delta T_{HT}$ of 40° C., would be ~1.5× 10⁴ hr⁻¹. Given bed-packing materials that are presently known in the art, including particulate packing, and foam and honeycomb monoliths, the present invention can be operated at high efficiency at a space velocity up to about 100,000 hr⁻¹.

In a preferred embodiment the bed packing material will have several characteristics. It will have the ability to cycle repeatedly between high (e.g. ≧1000° C.) and low (e.g. ≦600° C.) temperatures, provide high wetted area (e.g. ≧6 cm⁻¹) and volumetric heat transfer coefficient (e.g. ≧0.02 cal/cm³s° C., preferably ≧0.05 cal/cm³·° C., and most preferably ≧0.10 cal/cm³s° C.), have low resistance to flow (i.e., low pressure-drop), have operating temperature consistent with the highest temperatures encountered during regeneration, and have high resistance to thermal shock. Furthermore, it is preferred that the material has high bulk heat capacity (e.g. ≧0.10 cal/cm³·° C. and preferably ≧0.20 cal/cm³·° C.). Additionally, the bed packing material will provide sufficient support for the reforming catalyst in the reforming bed. These requirements are met via control of the shape, size, and composition of the bed packing materials.

The shape and size of the bed packing material impact the beds heat transfer capability and flow resistance. This is because packing shape and size impact how the fluid flows through the packing, including, the size and turbulence in the fluid boundary layers that are the primary resistance to heat, mass and momentum transfer between fluid and solid. Furthermore, the size of the materials also impacts thermal shock resistance of the bed, because larger structures are typically susceptible to thermal shock. The shape impacts bed heat capacity through its relationship on bed void volume. The design of advantageous packing shapes to achieve these aspects of the invention is known in the art.

Examples of suitable packing materials include honeycomb monoliths and wall-flow monoliths, which have straight channels to minimize pressure drop and enable greater reactor length. Preferred honeycomb monoliths for the present invention will have channel densities that range from about 100 channels/in² to about 3200 channels/in² (15-500 channels/cm²). In an alternate embodiment more tortuous packing, such as foam monoliths and packed beds may be employed. Preferred foam monoliths for the present invention will have pore densities that range from about 10 ppi (pores per inch) to about 100 ppi (i.e. 4-40 pore/cm). Preferred packed beds for the present invention will have packing with wetted surface area that range from about 180 ft⁻¹ to about 3000 ft⁻¹ (i.e. 6-100 cm⁻¹).

The composition of the bed packing material is selected for operating temperature and thermal shock resistance. Thermal shock resistance is generally greatest for materials having low coefficients of thermal expansion, because it is the temperature-induced change in size that stresses a component when temperatures are changing due to cycling. Ceramic materials that are resistant to combustion temperatures and thermal shock are preferred. Cordierite materials (magnesium aluminum silicates) are preferred for their very low coefficients of thermal expansion. Additional preferred materials of construction include aluminum silicate clays, such as kaolin, aluminum silicate clay mixed with alumina, or aluminum silicate clay and alumina mixed with silica and optionally zeolites. Other suitable materials of construction include mullite, alumina, silica-alumina, zirconia, and generally any inorganic oxide materials or other materials stable to at least 1000° C. The materials may be used alone or in combination, and may have their structures stabilized, for example by use of rare earth additives. The bed packing materials of the regenerating zone can either be the same or different from the packing materials of the reforming zone.

The configuration of the beds within the reforming and recuperating zones may take the many forms that are known in the art. Acceptable configurations include horizontal beds, vertical beds, radial beds, and co-annular beds. Packing may be monolithic or particulate in design. Particulate packing may become fluidized during some steps of the present invention. In a preferred embodiment, bed packing is maintained in a fixed arrangement.

Suitable reforming catalysts include noble, transition, and Group VIII components, as well as Ag, Ce, Cu, La, Mo, Mg, Sn, Ti, Y, and Zn, or combinations thereof, as well as other metal and non-metal materials added to stabilize and/or enhance catalytic performance. As used herein above, the term component relates to a metal or metal oxide thereof. Preferred catalyst systems include Ni, NiO, Rh, Pt, and combinations thereof. These materials may be deposited or coated on, or in, catalyst supports well known in the art.

Figure 2:
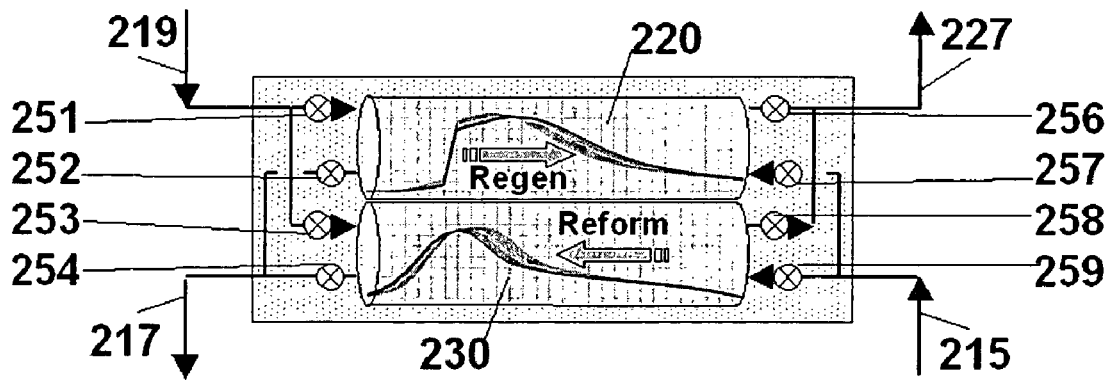
FIG. 2 is a diagrammatic illustration of temperature swing reforming using a dual bed, valved system.

FIG. 2 illustrates an embodiment of the temperature swing reforming diagrammatically illustrating the cyclic reforming and regeneration process. In this embodiment, two temperature swing reforming bed systems are used simultaneously such that one system is reforming while the other is regenerating. The use of multiple beds can provide a substantially continuous flow of reformed product notwithstanding the cyclical operation of each bed. In FIG. 2, a first bed (220) is engaged in the step of regeneration, while a second bed (230) is engaged in the step of reforming. Each bed (220 and 230) includes both reforming and recuperating zones. In this embodiment, several sets of valves are used to control the various streams flowing to and from the beds. A first set of valves (257 and 259) controls the flow of hydrocarbon feed and steam feed to the beds, while a second set of valves (252 and 254) control the flow of the product of the reforming step exiting the recuperating zones. The third set of valves (251 and 253) regulate the flow of oxygen-containing gas/fuel and optional non-combusting gas to the beds and the fourth set of valves (256 and 258) control the flow of fluegas exiting the reforming zone.

In operation, when valves (251), (254), (256), and (259) are open, valves (252), (253), (257) and (258) are closed. With these valve states, oxygen containing gas and fuel (219) enter the bed (220) through valve (251) while fluegas (227) exits the bed (220) through valve (256). Concurrently, the hydrocarbon and steam feed (215) enters the second bed (230) through valve (259) while the product of reforming (217) exits this bed (230) through valve (254). At the conclusion of this step, valves (252), (253), (257) and (259) now open and valves (251), (254), (256) and (257) now close, and the cycle reverses, with the first bed (220) reforming the feed and the second bed (230) regenerating the heat.

Figure 3:
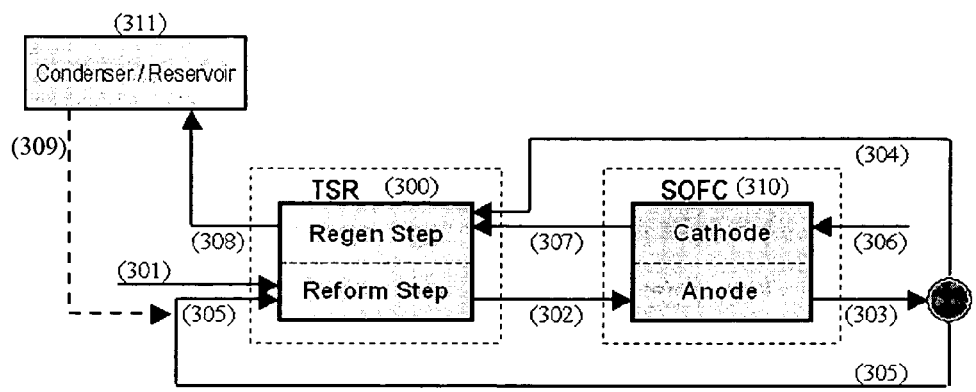
FIG. 3 is a diagrammatic illustration of a process design using temperature swing reforming for a solid oxide fuel cell application.

FIG. 3 diagrammatically illustrates the temperature swing reforming process described above to supply hydrogen fuel to a solid oxide fuel cell. The TSR unit (300) may include a single bed or preferably, multiple beds. In the optional embodiment of multiple beds the valving and flow controls are contained within the unit (300) and not illustrated in this Figure. Their form and function are as described above in reference to FIG. 2. Referring to FIG. 3, a hydrocarbon containing feed (301) such as gasoline, and steam (305) are supplied to the reforming zone of the TSR reactor (300). The hydrocarbon containing feed gases and steam are converted to a synthesis gas using the temperature swing reforming process previously described. The synthesis gas (302) generally comprises CO, $CO_2$, $H_2$, $H_2O$ and residual hydrocarbon gases. The temperatures of the syngas produced by TSR ranges from about 200° C. to about 800° C., and preferably from about 300° C. to about 600° C. The outlet pressure of syngas produced by TSR ranges from about zero (0) atmospheres gauge to about twenty-five (25) atmospheres, and preferably from about zero (0) atmospheres to about five (5) atmospheres gauge pressure.

The hydrogen containing syngas (302) is fed to the fuel cell anode. In a preferred embodiment the SOFC, and in particular the anode region of the cell, operates at elevated temperatures, typically from about 600° C. to about 1200° C. The syngas (302) undergoes additional reforming of CO and residual hydrocarbon at the anode region of the SOFC to further enrich the hydrogen content of the fuel. The hydrogen enriched syngas is supplied to the fuel cell anode where its hydrogen content serves as fuel for the herein described electrochemical reaction to generate electricity. The term hydrogen enriched means a syngas having additional hydrogen content, which in this embodiment is produced by the additional reforming of steam and CO, CO2 residual hydrocarbons, or mixtures thereof that occurs in the anode region of the SOFC. Oxygen containing gas (306), typically supplied as air, is fed to the cathode of the SOFC (310). The hydrogen enriched syngas "fuels" the SOFC electrochemical reaction. SOFC oxygen ions are transported across the dense electrolyte to combine with protons at the anode. As the negatively charged oxygen ion combine with hydrogen to produce $H_2O$, the oxygen ions at the anode supply electrons that return through the external load to the electron deficient cathode. The effluent from the anode, (303), comprises CO, $CO_2$, water (or steam) produced in the reaction, along with any residual hydrogen not consumed by the fuel cell. In a preferred embodiment, the residual fuel content of this effluent stream is used to fuel the regeneration process of TSR described hereinabove. Accordingly, effluent stream (303) is split into at least two streams (304) and (305), where stream (304) comprises sufficient fuel to accomplish the combustion step of the TSR regeneration step as described above, and stream (305) includes sufficient water content to supply reforming steam to the TSR process.

In a preferred embodiment, the cathode effluent (307) is utilized for the TSR regeneration process, the air introduced into the cathode being sufficient to supply the oxygen requirement of the SOFC cathode, and serve as the oxidant in the regeneration cycle for TSR as described above. Typically, oxygen containing supply (306) comprises a gas having an oxygen stoichiometry of about 1.2 to 2.0 and preferably 1.2 to 1.5 at the SOFC cathode (i.e. about 20% to about 100% excess oxygen supplied at the cathode).

Though illustrated as physically separated, in a preferred embodiment TSR (300) and the SOFC (310) comprise a physically integrated apparatus. Advantages of the integrated apparatus include improved heat integration, reduction or elimination of liquid water collection and storage means, and rapid initial heat up of the SOFC to suitable operating temperature. In a physically integrated system, the inputs and outputs from the TSR reactor and the SOFC are directly coupled with the use of no processes other than heat exchange among these streams. The oxygen source for the TSR is delivered by the cathode exhaust gas (stream 307). The TSR reforming effluent is used directly, without further processing, by the SOFC anode. The anode effluent (303) is used directly as the source of steam (305) from the reformer and as the source of fuel (304) for the TSR regeneration step. Intermediate processes other than optionally heat exchange are not required when the two processes are so integrated. This avoids the complexity of other processes such as water condensation, water gas shift, hydrogen separation, or carbon monoxide removal. FIG. 3 illustrates one such embodiment of a directly coupled TSR-SOFC, with optional heat exchange not shown. The physical integration of the processes results in the units placed within the same thermally insulated system, minimizing the size of auxiliary pipes, insulation and other components. In this embodiment, the TSR processes are run at about the same pressure as the SOFC.

EXAMPLE 1

The following example is included to better illustrate aspects of the present invention. An amount of methane was used as a feed to the integrated TSR/SOFC system illustrated in FIG. 3. The results shown are for methane feed at about 8000C1 GHSV and a 3-second TSR cycle time. The steam/carbon ratio into the reforming side is about 1.5. Hydrogen utilization in the fuel cell stack is about 0.8, CO utilization is about 0.39. In typical operations, the hydrogen utilization and relative reaction rate/utilization of H2 and CO will vary with fuel cell type membrane chemistry, temperature and other cell parameters. The split of stream (303) is about 53% into (305) and about 47% into (104). Key operating and process parameters are identified in the following Table 1.

TABLE 1

| Stream gmols | 301 Ref-Fd | 302 Ref-out | 303 SOFC-out | FC-H2-rx | 305 Rfm-Rcy | 304 Rgn-Fuel | 307 Cathode Effluent | 308 Regen Effluent |
|---|---|---|---|---|---|---|---|---|
| Temp C. | 500 | 542 | 527 | | | | | 504 |
| P AtmGa | 0.5 | 0.3 | 0.2 | | 0.2 | 0.2 | 0.2 | 0.1 |
| $CH_4$ | 4.07 | 0.12 | 0.12 | 0 | 0.05 | 0.07 | | 0 |
| $H_2O$ | 0 | 2.73 | 13.05 | 0 | 6.19 | 6.86 | | 8.46 |
| $H_2$ | 0 | 12.9 | 2.58 | 12.73 | 1.22 | 1.36 | | 0 |
| CO | 0 | 6.13 | 3.72 | 0 | 1.76 | 1.96 | | 0 |
| $CO_2$ | 0 | 1.41 | 3.83 | 0 | 1.82 | 2.01 | | 3.97 |
| $N_2$ | 0 | 0.15 | 0.15 | 0 | 0.07 | 0.08 | 30.75 | 30.73 |
| $O_2$ (in mols) | 0 | 0 | 0 | 0 | 0 | 0 | 1.79 | 0.01 |
| | 4.07 | 23.44 | 23.45 | 12.73 | | 12.34 | 32.54 | 43.17 |

Under certain fuel cell operating conditions, the water content of the anode effluent stream may be insufficient to satisfy the water needs of the TSR or other system reforming requirements. Additional "make-up" water (309) may be added as illustrated by the dashed lines of (305), however, in a preferred embodiment of the present invention, an optional condenser and water reservoir (311) are utilized to collect and store water from the TSR regeneration effluent to (308). This water can be injected into the TSR reformer cycle along with fuel (301) and anode effluent residual fuel (305), as required.

Figure 4:
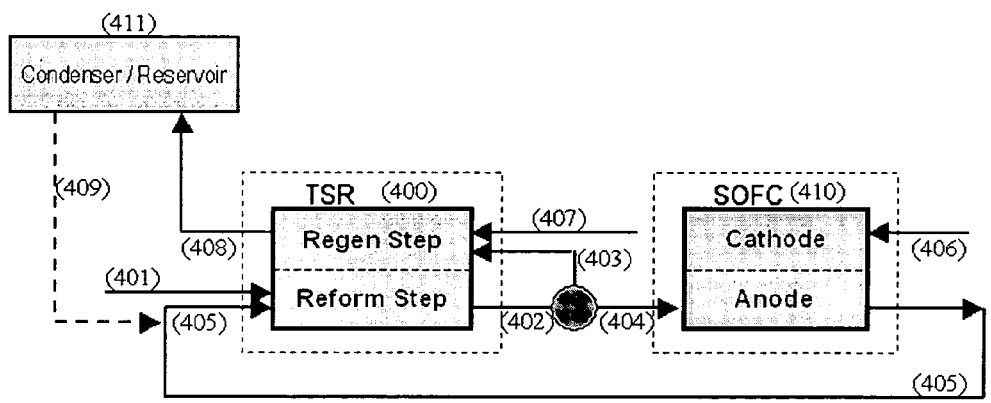
FIG. 4 is a diagrammatic illustration of an alternative process design using temperature swing reforming for a solid oxide fuel cell application.

An alternative embodiment of the present invention is illustrated in FIG. 4. The embodiment illustrated in this figure may be advantageous where the SOFC anode effluent does not contain adequate fuel to effectively supply the regeneration for TSR as described hereinabove. In this embodiment, the TSR reformer effluent (402) is split between supplying hydrogen enriched fuel gas (404) to the anode of the SOFC, and supplying a sufficient amount of fuel (403) for TSR regeneration. Anode exhaust (405) comprising residual CO, $CO_2$, produced water, and any residual fuel not consumed by the SOFC, is returned to the reforming zone as feed to the reforming step of TSR as described above.

As described in respect of FIG. 3, oxygen containing gas (406), typically supplied as air, is fed to the cathode of the SOFC. In a preferred embodiment, cathode effluent (407) is utilized for the TSR regeneration process, the oxygen containing supply (406) introduced into the cathode being sufficient to supply the oxygen requirement of the SOFC cathode and serve as the oxidant in the TSR regeneration cycle.

As described in respect of the embodiment illustrated in FIG. 3, a water condensing means and reservoir (411) may be optionally used to capture and store produced water from the TSR regeneration effluent (408) and supply or supplement the water (steam) requirements of the TSR (409).

Figure 5:
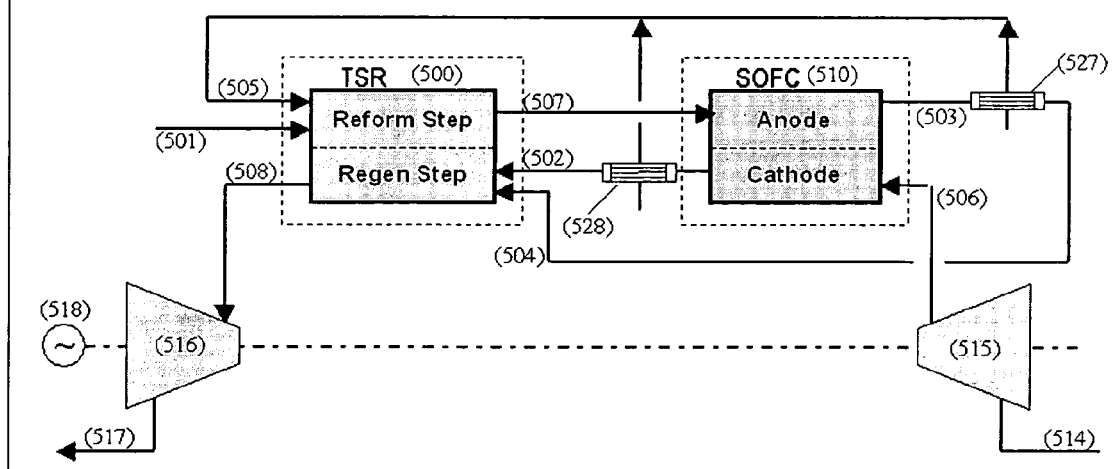
FIG. 5 is a diagrammatic illustration of a process design using temperature swing reforming for a solid oxide fuel cell application including co-generation means.

An alternate embodiment of the present invention is shown in FIG. 5, which utilizes the TSR fuel cell system illustrated in FIG. 3 and described heretofore, in combination with additional power generation means, typically turbines. Referring to the Figure, the TSR (500) reforming step is fed with streams containing hydrocarbon (501) and steam (505); the reform effluent (507) is fed to the SOFC (510) anode; the SOFC cathode is fed with air (506); the cathode effluent (502) is fed to the TSR regeneration step; and the SOFC anode effluent (503) is used for regeneration fuel (504) all as described previously in respect of FIG. 3. In this embodiment, additional power is generated from the waste heat of the TSR—SOFC system. Steam (505) is generated using SOFC waste heat. In one embodiment, illustrated in FIG. 5, the waste heat is collected by cooling the anode and cathode effluents in steam boilers (527, 528), respectively, resulting in process steam (505). Other embodiments (not shown) may collect heat directly from the SOFC. The combination of a compressor (515) and expander (516) is used to pressurize air (514) into the cathode feed (506) and to generate power (518) from the regenerator effluent (508), as it is depressurized to become flue gas (517). Surplus steam (505), beyond what is needed for reforming, can be added to the regenerator effluent (508) to increase expander power.

What is claimed is:

1. A method for producing electrical energy comprising:
   (a) reforming a hydrocarbon containing feed with steam in a cyclic reforming and regeneration process comprising:
      i. introducing the feed and steam through a first zone of a reactor containing bed packing material and a reforming catalyst at a space velocity $C_1$GHSV of at least 500 under reforming conditions, wherein calculation of $C_1$GHSV includes bed volume of all catalysts and heat transfer solids in reforming and regeneration zones;
      ii. passing at least a portion of the product of step I through a second zone of the reactor containing bed packing material and transferring heat from the product to the packing material;
      iii. removing substantially all the product from the second zone said product comprising a syngas enriched in hydrogen,
      iv. introducing an oxygen containing gas into the second zone and combusting the gas and a fuel in a region proximate to an interface between the first and second zone to produce heat and a combustion product and transferring heat of the combusting to the bed packing material of the first zone,
      v. removing substantially all of the combustion product from the first zone, and
   (b) supplying said reform product from step iii to an anode of a solid oxide fuel cell to produce electricity.

2. The method of claim 1 wherein the cyclic reforming process apparatus and the solid oxide fuel cell are commonly contained.

3. The method of claim 1, wherein the cyclic process has a characteristic $\Delta T_{HT}$ ranging from about 0.1° C. to about 500° C.

4. The method of claim 1 wherein $\Delta T_{HT}$ ranges from about 0.5° C. to about 40° C.

5. The method of claim 1 wherein the space velocity ranges from about 1,000 to about 100,000 $hr^{-1}$.

6. The method of claim 5 wherein the space velocity ranges from about 2,000 to about 50,000 hr$^{-1}$.

7. The method of claim 5 wherein the reactor bed packing material has a volumetric heat transfer coefficient of greater than about 0.05 cal/cm$^3$s° C.

8. The method of claim 7 wherein the packing material is a honeycomb monolith having channel densities ranging from about 15 channels/cm$^2$ to about 500 channels/cm$^2$.

9. The method of claim 5 wherein the packing material provides a wetted area greater than about 6 cm$^2$/cm$^3$.

10. The method of claim 5, wherein the packing materials of said first zone or said second zone or both are composed of a material selected from stabilized or unstabilized magnesium aluminum silicates, aluminum silicate clays, mullite, alumina, silica-alumina, zirconia, and mixtures thereof.

11. The method of claim 1, wherein the catalyst is selected from the group consisting of noble metal components, Group VIII metal components, Ag, Ce, Cu, La, Mo, Mg, Sn, Ti, Y, and Zn.

12. The method of claim 1, wherein the hydrocarbon containing feed with steam has an inlet temperature ranging from about 200° C. to about 1000° C.

13. The method of claim 12, wherein the hydrocarbon containing feed with steam has an inlet temperature ranging from about 200° C. to about 600° C.

14. The method of claim 1, wherein the reforming conditions comprises a reforming catalyst having at least a portion thereof heated to a temperature of about 700° C. to about 2000° C.

15. The method of claim 1 wherein fuel cell cathode effluent supplies at least a portion of the fuel and oxygen containing gas to step iv of the process.

16. The method of claim 15 wherein fuel cell anode effluent supplies at least a portion of the steam of step i of the process.

17. The method of claim 15 wherein cathode effluent supplies at least a portion of the oxygen containing gas to the region proximate to the interface between the first and second zone for step iv of the process.

18. The method of claim 2 wherein step B is further characterized as supplying a reform product comprising hydrogen, CO, CO$_2$, hydrocarbons, and steam to the fuel cell anode at a temperature of greater than about 200° C. whereby the reform product is further reformed to supply a hydrogen enriched syngas to the anode of the fuel cell.

19. The method of claim 1 wherein the fuel of step iv of the process is supplied by at least a portion of the syngas of step iii of the process.

20. The method of claim 1, including: measuring the temperature at or substantially at the interface between said first and second zones and, upon reaching a pre-determined first temperature, the oxygen-containing gas is introduced to said second zone; and measuring the temperature at about the first end of said first zone and, upon reaching a pre-determined second temperature, the hydrocarbon, containing feed and steam feed is introduced to said first end of said first zone.

21. The method of claim 1, including: measuring the temperature at about the interface between said first and second zones and, upon reaching a pre-determined temperature, regeneration step (iv) is begun, and measuring the temperature at about the first end of said first zone and, upon reaching a pre-determined second temperature, reforming and recovery steps (i), (ii), and (iii) are begun.

22. The method of claim 1 wherein two or more reactors are operated simultaneously, such that steps i, ii, and iii are in progress on at least one reactor while steps iv, and v are in progress on at least one other reactor providing a substantially uninterrupted stream of reform product to the fuel cell.

23. The method of claim 1 wherein effluent from the regeneration process of steps v, a turbine to produce power.

* * * * *